United States Patent Office 2,905,727
Patented Sept. 22, 1959

2,905,727

ETHYL CHLORIDE MANUFACTURE

Clarence M. Neher and Harry E. O'Connell, Baton Rouge, La., assignors to Ethyl Corporation, New York, N.Y., a corporation of Delaware No Drawing. Application August 18, 1955
Serial No. 529,327

2 Claims. (Cl. 260—662)

This invention relates to the production of alkyl chlorides and more particularly but not exclusively to the manufacture of ethyl chloride from hydrocarbons.

Ethyl chloride is an important and valuable commercial product which finds numerous uses both as an intermediate and as a final product. Thus, ethyl chloride is employed in the manufacture of tetraethyl lead, as well as being used as refrigerant and as a local anesthetic for minor operations. The most widely used commercial technique for its manufacture involves the hydrochlorination of ethylene by anhydrous hydrogen chloride in the presence of a liquid catalyst solution, or reaction medium, comprising ethyl chloride having dissolved therein anhydrous aluminum chloride or other similar catalysts. The use of super-atmospheric pressures (U.S. 1,518,182) has been found to be exceptionally effective, and pressures above atmospheric to over 11 atmospheres have been employed.

Ethane can also be converted to ethyl chloride by several well-known chlorination processes and has the important advantage of being available in large quantities and at a fraction of the cost of ethylene. The economical utilization of this cheaper raw material has heretofore been hampered by the inability to effectively obtain a complete utilization of all of the chlorine and ethane values employed therein. For example, the degree of conversion of ethane to ethyl chloride, as well as the avoidance of explosive mixtures, is facilitated by the presence of a large molar excess of ethane. The use of such an excess of ethane in an industrial process requires the continuous recycle of unreacted ethane in order to obtain a commercially practical yield of ethyl chloride. The product gases also contain considerable quantities of ethylene and hydrogen chloride which can only be separated by complex and costly operations. The continued presence of these non-reactables in the recycle stream constitutes a barrier to the use of a recycle operation since their concentration will continue to build up in the system. Further, the hydrogen chloride formed in the process not only represents, at the present time, a degradation of valuable chlorine, but also presents the more serious problem of the safe and economical disposal of this corrosive and toxic material.

The chlorination of ethane and concurrent vapor phase hydrochlorination of ethylene, using by-product hydrogen chloride from the chlorination reaction, has been suggested in U.S. Patent 2,246,082. While such a dual process has obvious economic advantages, there are a number of inherent problems which reduce the attractiveness of the two separate processes. First, in the chlorination process, the patent recognizes the serious problem of producing large quantities of polychlorinated ethane along with the desired ethyl chloride. The patent suggests the use of a high ethane-chlorine mole ratio, i.e., a ratio of 2:1 to about 7:1 or even higher to minimize by-product formation. However, under such conditions, the hydrogen chloride is mixed with very large quantities of unreacted ethane which cannot be fractionally separated from the desired hydrogen chloride except through a scrubbing or solvent extraction technique. Even when using water as the scrubbing media, most of the economic benefits of the dual process is lost in recovering anhydrous hydrogen chloride for subsequent reuse in the hydrochlorination process.

Although it is not suggested in the above patent, the most desired process would completely integrate the chlorination-hydrochlorination processes, i.e., a completely closed system, except for feeding fresh chlorine and hydrocarbons, and removing the chlorinated product. However, using the suggested hydrochlorination technique, complete integration creates many operational problems. The two processes must be constantly balanced to assure the requisite chlorine:ethane ratio in the chlorination step and the necessary hydrogen chloride:ethylene ratio in the hydrochlorination step. Moreover, large quantities of ethylene must be continuously recycled to the chlorinator. Although little ethylene reacts with chlorine in the chlorination reactor, apparently due to the presence of the much more reactive ethane, at elevated temperatures, a considerable quantity of ethylene (15 percent or more) and feed chlorine react even at low temperatures in the mixing and feed lines to the chlorinator, producing undesired 1,2-dichloroethane. Premixing of the chlorine and feed hydrocarbons is essential since the undesired 1,2-dichloroethane is produced in even greater quantities if the chlorine is fed directly to the reactor, apparently due to chlorination of the ethyl chloride product caused by localized high chlorine concentrations in the reactor.

Another very serious problem encountered in complete integration of these processes involves the presence of small quantities of water, entering the system in the feed streams, either as moisture or as oxygen, and building up in concentration during the cyclic operation. For example, even revaporized chlorine normally contains from 150–400 parts/million of water. Very unexpectedly, it has been found that hydrogen chloride drastically reduces the solubility of water in ethyl chloride. Thus, even very small concentrations of water results in the separation of the water as a separate liquid hydrochloric acid phase, which is very corrosive and causes serious operational problems involving costly distillation equipment. This limiting water solubility is of the order of 0.1–0.2 mole percent water in ethyl chloride which is far below the concentration which can be adequately removed by conventional drying techniques.

It is accordingly an object of this invention to provide an improved process for the manufacture of alkyl chloride. Another object is to provide a completely integrated chlorination of alkane-hydrochlorination of ethylene process which is easily controlled and which avoids the undue build-up of water introduced to the system. Another object, of preferred embodiments of this invention, is to provide a process which eliminates water either introduced or formed in the system, without creating a severe corrosion problem. Other objects and advantages of this invention will become apparent from the following description and appended claims.

The above and other objects are obtained when a chlorination of an alkane hydrocarbon, such as ethane, process is integrated as hereafter described with a liquid phase hydrochlorination of ethylene, using aluminum chloride as the catalyst. It has been found that aluminum chloride, in contrast to compounds of metals of group II or V of the periodic table, permits essentially complete ethylene hydrochlorination and eliminates or substantially reduces the by-product formation from ethylene in the chlorination reaction. Thus, in a completely integrated process, the formation of dichloroethanes and higher chlorinated derivatives from ethane can be maintained as low as about 5–10 percent, in contrast to 20–50 percent when using other hydrochlorination processes. Of even greater importance, it is found that the use of a liquid phase, aluminum chloride catalyzed hydrochlorination eliminates or materially reduces the problem of separating a liquid water phase during separation of ethyl chloride formed by hydrochlorination. In addition, this type of hydrochlorination can provide a beneficial effect with respect to the resolution of the products formed by chlorination particularly in regard to avoiding the adverse results of water formation during the chlorination. In addition to the avoidance of extreme corrosion problems through the results above, the present integrated process permits maximum reactor capacity by reducing the quantity of unreacted hydrocarbon recycle necessary for the production of a mono-chlorinated product, e.g., ethyl chloride.

As indicated, the hydrochlorination step of the process always involves the hydrochlorination of ethylene in the presence of a liquid catalyst solution containing aluminum chloride as the catalyst. An alkyl chloride, usually ethyl chloride is also formed in the chlorination step. The alkyl chlorides can be removed from the integrated processes either at separate points after each reactor, or primarily after the chlorination step, or, in the most effective embodiment, primarily from the effluent from the hydrochlorination step.

The chlorination process can be thermal or catalytic, including photochemical. However, in the preferred embodiment, the liquid phase hydrochlorination is integrated with a fluidized bed thermal chlorination. While it might be expected that the back mixing and the homogeneous character of the reaction mass anticipated in such a system would unduly increase the tendency for chlorination of the ethyl chloride product, it is found that just the opposite is true. The byproduct formation is actually materially reduced in such a system. Thus, contrary to expectation, less polychlorinated product is obtained using a fluidized bed than when using a tube type reactor with a single chlorine feed, or with multiple chlorine feed points along the reactor. Accordingly, when chlorinating ethane the fluidized reaction permits maximum production of ethyl chloride by allowing the use of relatively high chlorine/ethane ratios without undue by-product formation.

More particularly, the process of this invention which permits the production of ethyl chloride from ethylene and ethane or of ethyl chloride and other chlorinated alkanes with a minimum of polychlorinated alkane byproducts, comprises subjecting the hydrocarbon feed and hydrogen chloride, produced in the system, to liquid phase aluminum chloride catalyzed ethylene hydrochlorination conditions in a hydrochlorinating zone to convert the ethylene to ethyl chloride but leaving the ethane or other alkane fraction unreacted, passing at least a part of the unreacted alkane from the hydrochlorinating zone into a chlorinating zone, introducing chlorine into the chlorinating zone for reaction maintained under conditions to effect substitutive chlorination of a part of the alkane to produce additional ethyl chloride (or other chlorinated alkane) and hydrogen chloride, and passing at least a part of the hydrogen chloride and unreacted ethane to the hydrochlorinating zone, the latter hydrogen chloride so-produced being the hydrogen chloride above referred to, which reacts with the ethylene feed in the hydrochlorination zone. In a particularly effective embodiment of the process, ethyl chloride content of the chlorination step product stream is returned in the vapor phase to the hydrochlorination zone, as is the hydrogen chloride and ethane.

The chlorination reaction is preferably carried out adiabatically, i.e., the heat of reaction is equivalent to the sensible heat required to heat the feed gases to reaction temperature.

In any thermal chlorination reaction, small quantities of finely divided carbon tend to carry over with the reaction products so that the gases are normally passed through a solids separator, e.g., a fluid scrubber, prior to recycle to the hydrochlorinating zone or to recovery of the ethyl chloride product. Although the use of aluminum chloride catalyzed liquid phase hydrochlorination eliminates any serious problem due to water formation and build-up, the solid scrubber can employ a drying liquid, such as an aluminum chloride solution or sulfuric acid, to simultaneously remove at least a part of the troublesome water from the reactant products.

The ethyl chloride product is preferably recovered following the hydrochlorinating step. Thus, the ethyl chloride or other chlorinated alkane produced in the chlorinating zone is recycled through the hydrochlorinating zone. The ethyl chloride product in some cases can be separated directly from the chlorination product, but in this case water contaminant must be removed as a separate phase in the reflux drum of the fractionating tower.

The following are typical examples which illustrate the present invention but these examples should not be construed as in any way limiting the same. All parts refer to weight units unless otherwise specified.

EXAMPLE I

In this example, the hydrochlorination zone comprises a tower containing a solution of aluminum chloride dissolved in ethyl chloride. A gaseous feed containing ethylene and hydrogen chloride enters the reaction zone at the bottom of the tower and is bubbled through the catalyst containing solution. The reaction product and unreacted feed gases are removed at the top of the tower. The temperature of the reaction is maintained at about 120°–130° F. The reactor is also maintained under a pressure of between 120–130 p.s.i.g. The solution is periodically removed for the elimination of spent catalyst and for the addition of fresh active catalyst.

The chlorination reactor consists of a cylindrical vessel having a conical bottom section and an enlarged solids disengaging section above the reaction zone. Feed gases enter the chlorination zone through the cone section at a velocity sufficient to fluidize finely divided solids within the bed, approximately 1.5 ft./sec. resulting in fluidization of the solids to a depth of about 2 feet. The chlorination reaction zone is maintained at a pressure of 110 p.s.i.g. and a temperature of 730° F. The charge of solids in the reaction is about 185 pounds of sand per square foot of cross sectional area. These solids had the following approximate size distribution:

| Size range, through and retained on U.S. mesh screens | Weight percent |
| --- | --- |
| +80 | 38.6 |
| 80–100 | 36.5 |
| 100–140 | 21.3 |
| 140–170 | 2.0 |
| 170–230 | 1.4 |
| Through 230 | 0.2 |

The temperature of the feed gases averaged about 50°–75° F.

In this example, all of the ethyl chloride was condensed from the reaction products of the hydrochlorination reaction, the ethyl chloride, hydrogen chloride and unreacted ethane being recycled from the chlorination zone to the hydrochlorination zone. The non-condensed portion of the hydrochlorination gaseous reaction product, i.e., principally ethane was recycled to the chlorination.

The reaction product from the hydrochlorinating zone passes directly into a fractionating tower having a top temperature of −15° F. and a bottom temperature of 190° F.

The chlorination reaction product was passed through a trombone cooler and a solids separator. The latter consisted of a liquid scrubber in which the reaction gas and a hydrocarbon oil were passed through an orifice having a pressure drop of about 100 inches of water. The liquid was a petroleum fraction boiling above about 250° F. The separator was provided with a disengaging section which was packed with fibrous material to remove entrained oil from the gases. The HCl stripper following the chlorinating zone was operated with a temperature of 105° F. and 170 p.s.i.g. pressure. The temperature and pressure of the HCl stripper is very important and is set to remove all of the water (in this example 100 p.p.m.) with the HCl gas and ethyl chloride product for recycle to the hydrochlorinating zone wherein it is removed by the aluminum chloride catalyst. It is of utmost importance that no liquid water be present in the tower proper due to the highly corrosive nature of this system. It is also desirable to prevent formation of a separate liquid water phase in the reflux condenser. This is not normally as serious from an operational standpoint but requires expensive equipment.

The bottoms from the HCl stripper is fractionated in a clean up tower at 25 p.s.i.g. with 115° F. top temperature and 208° F. bottom temperature. The overhead from this column is sent to the final purification system.

The final purification system takes the bottom from the fractionation tower following the hydrochlorinating zone and the overhead from the clean up tower. This combined feed is fractionated first to remove more volatile material than ethyl chloride and then to remove material less volatile than ethyl chloride.

The following Table I gives the material balance for both the hydrochlorination and chlorination zones.

*Table I*

| Component | Hydrochlorination | | | Chlorination, feed | |
|---|---|---|---|---|---|
| | Feed | | Reaction product | | |
| | Fresh | Recycle | | Fresh | Recycle |
| Ethane | 7.1 | 424.0 | 431.1 | 203.9 | 388.7 |
| Ethylene | 183.1 | 5.5 | 0.9 | 1.0 | 0.8 |
| Methane | 0.9 | 22.3 | 22.8 | 3.1 | 19.4 |
| HCl | | 204.2 | 27.0 | | 22.3 |
| Chlorine | | | | 177.7 | |
| Ethyl chloride | | 160.4 | 377.8 | | 4.1 |
| Other Cl₂ products | | 8.2 | 1.1 | | |

EXAMPLE II

When Example I is repeated except that the ethyl chloride is recovered following both the hydrochlorination reactor and the chlorination reactor, generally similar results are obtained. Using this technique, more expensive distillation equipment is necessary to insure against corrosion of the recovery equipment following the chlorination. Table II shows the material balance for this example.

*Table II*

| Component | Hydrochlorination | | Chlorination | | |
|---|---|---|---|---|---|
| | Feed | | | Feed | Reaction product |
| | Fresh | Recycle | Reaction product | Fresh | Recycle |
| Methane | 0.6 | 22.3 | 22.5 | | 22.5 | 22.3 |
| Ethylene | 181.0 | 4.5 | 0.8 | | 0.8 | 4.5 |
| Ethane | 169.1 | 424.0 | 593.1 | | 593.1 | 424.0 |
| HCl | | 203.8 | 21.8 | | 21.8 | 204.2 |
| Chlorine | | | | 178.2 | | |
| Ethyl chloride | | 0.1 | 182.0 | | 2.4 | 159.2 |
| Other Cl₂ products | | | | | Trace | 8.0 |

In the above example, 159.2 moles per hour of ethyl chloride is produced in the chlorination reactor. Also obtained is 8.0 moles per hour of higher chlorinated ethanes, principally 1,1-dichloroethane. It should be noted that the by-product chlorides comprise only about 4 percent of the total product from the chlorination reaction. In addition, 182 moles of ethyl chloride are produced in the hydrochlorination reaction to the exclusion of any higher chlorinated derivatives. Thus, only about 2 percent of the total product is undesired polychlorinated by-products.

EXAMPLE III

When Example I is repeated except that a tube type chlorination reactor is employed, the integrated processes are similarly easily controlled and no difficulty is experienced with water in the recovery system but the by-product chlorides, particularly 1,2-dichloroethane, is appreciably increased, averaging about 32 percent of the total chlorinated ethane product. In this example, the chlorination reactor consisted of an elongated tube.

EXAMPLE IV

This example illustrates the effect of appreciable concentrations of ethylene in the hydrocarbon feed to the chlorination reactor. As pointed out above, very large quantities of 1,2-dichloroethane are formed if the ethane and chlorine are not premixed prior to entry into the chlorination reactor. Normally, as high as 20 to 50 percent of the chlorinated product is polychlorinated ethanes under such conditions. It was also pointed out above that when ethylene is present in the hydrocarbon feed, it reacts with the chlorine during the premixing to produce appreciable quantities of the undesired 1,2-dichloroethane.

Example I was repeated except that various quantities of ethylene were added to the hydrocarbon feed to the chlorinator. The quantites of ethylene corresponded to 3.2, 7.0, and 11.1 percent based upon the total hydrocarbon feed. The remaining hydrocarbon feed had a composition of 58 percent ethane, 26 percent methane and the remainder inert gases, principally hydrogen and nitrogen. The temperature of the mixing nozzle ranged from 80° to 166° F. The percent conversion for the various ethylene concentrations tested remained constant. When the residence time for mixing was 0.88 second, 12 percent of the ethylene was converted to 1,2-dichloroethane. When more complete mixing was employed corresponding to a period of 1.41 seconds, 14.5 percent of ethylene was converted to 1,2-dichloroethane.

From the above tests, it can be seen that the undesired 1,2-dichloroethane product is essentially proportional to the concentration of ethylene in the feed stream and the percent conversion increases with longer mixing periods.

The following examples illustrate the manufacture of chloromethanes in the chlorination reactor, with and without the concurrent formation of chlorinated ethane products. When employing feed mixtures of methane and ethane, it is preferred to use relatively high temperatures for the chlorination to favor the rate of methane chlorination relative to ethane chlorination. In addition, it is normally desired to use in excess of 50 mole percent, preferably in excess of 60 mole percent, methane relative to ethane, due to the difference in the chlorination rate of these hydrocarbons.

EXAMPLE V

Example I is repeated except that the feed to the chlorination zone contains 99 mole percent methane and 1 mole percent ethane and inerts. The chlorine:methane mole ratio is 0.2. The temperature of the reaction is 842° F. The recovery following the hydrochlorination reaction is modified to condense the more volatile methyl chloride. The product from the chlorination reaction contains 71 mole percent methyl chloride, 26 mole percent methylene chloride, and 3 mole percent chloroform.

EXAMPLE VI

When Example V is repeated using a chlorine:methane mole ratio of 0.4, the product contains 61 mole percent methyl chloride, 33 mole percent methylene chloride, and 6 mole percent chloroform.

EXAMPLE VII

Example I is repeated except that the hydrocarbon feed to the chlorination reactor contains 65 mole percent methane and 65 mole percent ethane. As in Example I, the chlorine:ethane mole ratio is 0.3. The temperature is maintained at about 932° F. The product contains 85 mole percent ethyl chloride, 3 mole percent ethylene, 8.5 mole percent methyl chloride, and 3.5 mole percent of higher chlorinated methanes and ethanes.

EXAMPLE VIII

Example I is repeated except that a part of the ethyl chloride product is recycled through the chlorination unit so as to produce predominantly a dichloroethane product. The mole ratio in this case is increased to one part of chlorine per part of ethane. The product contains approximately 5 percent of higher chlorinated ethanes, in addition to the dichloroethanes. When this example is repeated using higher and lower chlorine:ethane ratios, e.g., 0.5 and 1.5, similar results are obtained. With lower chlorine:ethane ratios, larger quantities of ethyl chloride must be recycled but the product is lower in higher chlorinated by-products. With higher mole ratios, the reverse is true. When using even higher chlorine:ethane ratios, i.e., from 2 to 3 trichloroethylene and tetrachloroethylene can be produced in the chlorination step, the hydrogen chloride also being recycled to the hydrochlorinating zone.

The aluminum chloride catalyst for the hydrochlorination reaction is preferably dissolved in ethyl chloride and generally is employed in concentrations of 0.05 to 1 percent based upon the weight of the ethyl chloride. A more preferred range is 0.1 to 0.3.

The temperature of the hydrochlorination depends on the pressure employed for the reaction and can range from refrigerated temperatures to relatively high temperatures. The reaction is normally carried out at temperatures of 0° to 250° F. and preferably in the range of 70° to 160° F., using sufficient pressure to maintain a liquid phase. When the above examples are repeated using temperatures of 70°, 125° and 160° F., similar results are obtained. For economic reasons, the temperature should be such as to permit the use of cooling water for refrigeration. The pressure is then set by the temperature and the equilibrium vaporization conditions of the system. Using aluminum chloride as a catalyst, the feed ethylene can range from relatively dilute streams to relatively concentrated streams. In a completely balanced plant, the ethane and ethylene ratio reacted should be approximately 50 percent or slightly greater to compensate for the additional HCl resulting from small quantities of overchlorinated by-products. The fresh ethylene feed can be an ethane-ethylene mixture or pure ethylene. Propylene is an undesired impurity in the hydrochlorination reaction but quantities of methane can be tolerated. The methane concentration is normally maintained below about 50 percent, preferably below about 10 percent.

The chlorination reaction can be either catalytic or thermal and can be carried out at temperatures ranging from about room temperature to about 1100° F. or higher. When photochemical catalysis is employed, the temperature is normally maintained between about 0° and 500° F., preferably 30° to 150° F. Pressure can be employed as desired. When Example I is repeated using a photochemical reactor, similar results are obtained. However, the reaction is inhibited by many paramagnetic materials, such as oxygen, nitrogen, sulfur and the transition metals. When using photochemical chlorination, a spray phase technique is preferred. At higher $Cl_2$ concentrations, multiple chlorine injection gives higher ethyl chloride yields.

The temperature for thermal chlorination is normally between about 660°–950° F. A more preferred temperature range for ethane chlorination is from about 700° to 800° F.

With thermal chlorination, pressure is normally desired although atmospheric pressure can be employed. Pressures as high as 500 p.s.i.g. or higher are practical but a preferable range is 50 to 250 p.s.i.g.

Thermal chlorination can be carried out in a tube type reactor or a cylindrical vessel. External heating can be employed for maintaining reaction conditions. The most preferred chlorination technique involves balancing the heat generated in the reaction and the heat required to raise the temperature of the feed gases to reaction temperature. A fluidized system is also preferred in which heat is transferred by inert fluidized particles. Normally the feed gases enter the bottom of the reactor with sufficient superficial velocity to maintain the inert media in a fluidized condition.

Suitable inert fluidizing media are graphite, active alumina, alundum, silicon carbide, mullite, and sand. When any of these are used in the above examples, similar results are obtained. These typical examples have bulk densities in the preferred range of about 90–120 pounds/cu. ft. The density of the fluidizing media is not critical and can range from about 50–150 pounds/cu. ft. Normally any inert fluidized media becomes coated with carbon after a short reaction period, which carbon modifies the density of the media. The carbon coating has been found to be very advantageous since it is highly inactive and reduces ethylene formation to a minimum. Best results are obtained when the media has a carbon content equivalent to 10 to 20 percent of the total weight of the media.

The particle size is important but not critical. The upper limit is determined primarily by the ability of the media to be fluidized. The lower particle size limit is principally determined by the tendency of the media to be carried out of the reaction zone by the reaction gases.

Velocities through the reactor can range from 0.3 to 3 feet per second with superficial linear velocity of 1 to 2 feet per second being preferred.

The hydrocarbon feed to the chlorination should be primarily ethane or other alkanes and contain a minimum of ethylene. In general, the ethylene concentration should be maintained below about 10 percent but preferably below about 1 percent, based on the ethane. Normally, when using aluminum chloride to catalyze the hydrochlorination reaction, only traces of ethylene are present in the exit gases. For this reason, it is preferred to feed the hydrocarbon mixture, i.e., both the ethylene and ethane, to the hydrochlorination unit and to use no fresh ethane feed directly to the chlorination unit. When it is desired to provide fresh ethane feed to the chlorinator, the ethylene should be maintained at a low level but this will be dictated by the economics of purifying the stream versus the loss in hydrocarbon and chloride resulting from the formation of polychlorinated derivatives.

The chlorine to alkane ratio in the chlorinator is a matter of economics and normally ranges from 0.1 to 1 with a more preferred range being 0.2 to 0.7. Lower chlorine to alkane (ethane) ratios provide even more selective ethyl chloride production but require proportionally greater recycle through the hydrochlorination reactor, thus reducing the through-put capacity of the unit. Higher chlorine:ethane ratios increase materially the formation of undesired polychloroethanes. When Example I is repeated using mole ratos of 0.2, 0.8, and 1.0, the conversions of ethane to ethyl chloride are 95.5%, 76%, and 67%, respectively. It is therefore apparent that the yield of desired product is reduced appreciably at higher chlorine concentrations.

The chlorination reaction gases, as pointed out above, are preferably scrubbed with an anhydrous liquid to remove small quantities of carbon fines which are carried over from the disengaging section of the reactor. While constituting only a few parts per million, these carbon particles tend to foul the recovery section if permitted to build-up over long periods of time. One example of a suitable carbon scrubbing technique is illustrated in Example I. When this example is repeated using other anhydrous liquids, including different hydrocarbon fractions, chlorinated hydrocarbons such as dichloroethanes or higher chlorinated ethanes, similar results are obtained. Other anhydrous liquids which can be employed in Example I are drying agents, such as concentrated sulfuric acids and non-aqueous solutions of aluminum chloride. A particularly suitable medium is the hydropolymer of aluminum chloride (in ethyl chloride solvent) which is removed from the hydrochlorination reaction as spent catalyst. This hydropolymer contains appreciable quantities of aluminum chloride. The use of a drying agent in Example I, e.g., sulfuric acid materially reduces the quantity of water in the chlorination reaction product. The temperature of the HCl stripping tower is still maintained relatively high to remove the water which still passes through the scrubbing unit.

The apparatus for use in the scrubbing technique can be a venturi or merely a simple orifice. A reduced pipe section in the exit gas line has been found entirely suitable.

The pressure drop across the orifice determines to a large extent the efficiency with which the carbon particles are removed from the exit gas by the anhydrous liquid. In general, a pressure drop of the order of 50 inches of water should be employed, although a pressure drop of above 80 inches of water is preferred. While a pressure drop in excess of 150 inches of water effectively removes the entrained carbon particles, it is not normally necessary to employ such a high energy input.

The pressure drop of course depends upon the degree of restriction of the orifice, the volume of flow of reaction gases and the quantity of anhydrous liquid employed in the scrubbing operation. However, the critical factor is the degree of pressure drop which is a measure of the input into the system. In general, about 10-200 gallons of liquid are employed per 1000 cu. ft. of gas. A more preferred range is from 20-60 gallons per cu. ft. of gas. Under these conditions and having a reaction gas stream containing from 0.001 to 0.05 gram per standard cubic foot, the fines removal is approximately 99 percent efficient.

The ethyl chloride recovery equipment can be of any conventional design which will separate the hydrogen chloride and higher chlorinated derivatives from the desired ethyl chloride. As pointed out above, a liquid water phase should not be permitted to form in either the distillation tower or the reflux condenser and this can be accomplished by maintaining the distillation temperature sufficiently high to avoid the condensation of water in the reflux condenser. In the presence of hydrogen chloride, the solubility of water in the organic phase is so minute that the temperature in the reflux condenser must be maintained above about 80° F. to assure against the formation of a separate water phase. In addition, the temperature and pressure of the top of column must be such as to remove as a vapor all the water in the system. At 90° F. and 185 p.s.i.g., approximately 100 p.p.m. of water is removed overhead. This is more than would normally be introduced in the feed streams.

The integration of the chlorination and hydrochlorination reactions can be controlled by maintaining a constant ethylene feed to the hydrochlorinator and a constant chlorine feed to the chlorinator, making sure that sufficient ethane is present to provide the preferred mole ratio of chlorine:ethane in the chlorination reactor. Since in host hydrocarbon streams, which are used commercially, small quantities of methane will normally be present, a quantity of ethane fed to the system can be continuously or periodically vented following the chlorination reactor to prevent any undue build-up of methane in the reacting gases. If no such vent is employed, the methane will build-up in the cyclic operation to a point wherein it tends to be chlorinated. Normally, the venting is accomplished so as to maintain the methane concentration below about 50 percent and preferably below about 20 percent of the total gas feed to the chlorination reactor. When Example I is carried out over long periods of continuous operation a vent of hydrocarbon gases (at a point prior to entry into either the hydrochlorination reactor or the chlorination reactor) to maintain the methane concentration at 10 weight percent or at 5 weight percent of the total hydrocarbon feed to the chlorination gives similar results.

In the following claims the term "alkane" means a saturated hydrocarbon, either branched or straight chain. Examples are given above using ethane and methane. Higher molecular weight alkanes can be employed, normally up to about 10 carbon atoms. Particularly suitable are the normally gaseous hydrocarbons including propane and butane. When the latter are employed in the above examples similar results are obtained except that chloropropane and chlorobutane are produced in the chlorination zone.

The above examples illustrate the production of methyl chloride. Higher chlorinated methanes can also be produced including dichloromethane, chloroform, and carbon tetrachloride. Also, the higher chlorinated propanes and butanes can be produced.

When the above examples are repeated using a chlorine/alkane mole ratio of 1.0 and the lower chlorinated alkanes are recycled, methane can be chlorinated to polychlorinated derivatives, the product depending upon the quantity of methyl chloride or derivatives recycled.

Operation of the hydrogen chloride stripper when producing ethyl chloride to remove the water and the major portion of the ethylchloride from the higher chlorinated derivatives for recycle to the hydrochlorination reactor can vary appreciably with respect to condenser temperature and pressure. The operation of the stripper also depends upon the normal quantity of the water which is present in the reaction gases from the chlorination reactor. In general, the condenser temperature should be maintained above about 80° F., preferably 85° F. and at least 40 percent of the ethyl chloride from the chlorination reactor should be taken overhead, preferably above 65 percent. Normally, the minimum pressure to be employed should be about 175 p.s.i.a., although above 185 p.s.i.a. is preferred.

The temperature and pressure conditions must be correlated for proper operation of the hydrogen chloride stripper. The following table shows the effect of varying these conditions and other conditions in the stripper. In operation, the mole percent of ethyl chloride vapor in the overhead should be at least equal to that required to remove all of the water in the feed gases.

Table III

| Pressure, p.s.i.a. | $Cl_2/C_2H_6$, mole ratio | Condenser temp., °F. | Percent of total EtCl in overhead | EtCl, mole percent in overhead | Mole percent $H_2O$ in overhead |
|---|---|---|---|---|---|
| 185 | 0.3 | 85 | 65 | 13.5 | 0.019 |
|  | 0.3 | 100 | 90 | 17.7 | 0.045 |
|  | 0.5 | 103 | 65 | 18.1 | 0.039 |
|  | 0.5 | 117 | 90 | 23.4 | 0.080 |
| 200 | 0.3 | 90 | 65 | 13.5 | 0.021 |
|  | 0.3 | 105 | 90 | 17.7 | 0.047 |
|  | 0.5 | 93 | 45 | 13.3 | 0.018 |
|  | 0.5 | 108 | 65 | 18.1 | 0.044 |
|  | 0.5 | 122 | 90 | 23.4 | 0.088 |
| 250 | 0.3 | 103 | 65 | 13.5 | 0.029 |
|  | 0.3 | 118 | 90 | 17.7 | 0.065 |
|  | 0.5 | 105 | 45 | 13.3 | 0.025 |
|  | 0.5 | 122 | 65 | 18.1 | 0.059 |
|  | 0.5 | 135 | 90 | 23.4 | 0.093 |

We claim:

1. In an integrated hydrochlorination-chlorination process for production of ethyl chloride from ethylene and ethane, said process comprising feeding an ethylene feed and a recycled process stream including hydrogen chloride, at least equal to the ethylene feed, and ethane, to a hydrochlorination zone, said zone having a liquid reaction medium therein comprising ethyl chloride having a dissolved aluminum chloride catalyst therein, and forming in said zone a gaseous hydrochlorination product stream including ethyl chloride, ethane and hydrogen chloride, and then thermally chlorinating the ethane hydrocarbon in a chlorination zone, forming a gaseous chlorination product stream including ethyl chloride, polychloroethanes, ethane, hydrogen chloride and water impurity, and recycling hydrogen chloride to the hydrochlorination zone in quantity at least sufficient to react with the ethylene fed thereto; the improved method of recovery comprising fractionating said gaseous chlorination product stream components into a liquid bottoms stream and a gaseous overhead stream, the bottoms stream being a water-free, single phase, liquid fraction including the polychloroethanes, but not more than about 60 percent of the total ethyl chloride in the gaseous product stream, and the gaseous overhead stream including at least about 40 percent of said ethyl chloride, and ethane and hydrogen chloride and the water vapor, withdrawing the said bottoms stream, and passing said gaseous overhead stream to the hydrochlorination reactor, wherein the water vapor in the said gaseous overhead stream is eliminated, and a water-free gaseous hydrochlorination product stream is formed in said hydrochlorination zone, and thereafter recovering substantially all the ethyl chloride present in the said hydrochlorination product stream.

2. The process of claim 1 further defined in that the liquid bottoms stream contains not more than about 35 percent of the ethyl chloride present in the chlorination product stream and the gaseous overhead stream contains at least 65 percent of said ethyl chloride.

References Cited in the file of this patent

UNITED STATES PATENTS

| | | |
|---|---|---|
| 2,140,508 | Chamberlain et al. | Dec. 20, 1938 |
| 2,246,082 | Vaughan et al. | June 17, 1941 |
| 2,676,998 | Kuntz et al. | Apr. 27, 1954 |

FOREIGN PATENTS

| | | |
|---|---|---|
| 235,521 | Great Britain | Sept. 24, 1925 |
| 897,552 | Germany | Nov. 23, 1953 |